United States Patent
Kamada

(10) Patent No.: US 7,802,544 B2
(45) Date of Patent: Sep. 28, 2010

(54) ENGINE LOAD ESTIMATING APPARATUS AND ENGINE LOAD ESTIMATING METHOD

(75) Inventor: Shinobu Kamada, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 393 days.

(21) Appl. No.: 12/045,923

(22) Filed: Mar. 11, 2008

(65) Prior Publication Data

US 2008/0223341 A1 Sep. 18, 2008

(30) Foreign Application Priority Data

Mar. 14, 2007 (JP) ............................ 2007-064994

(51) Int. Cl.
*F02B 75/04* (2006.01)
*F02B 75/32* (2006.01)
(52) U.S. Cl. .................. 123/78 F; 123/78 E; 123/197.4
(58) Field of Classification Search ............... 123/48 B, 123/78 E, 78 F, 197.4, 350, 681, 682, 435
See application file for complete search history.

(56) References Cited

U.S. PATENT DOCUMENTS

| 6,915,766 B2 * | 7/2005 | Aoyama et al. ........... 123/78 E |
| 7,100,547 B2 * | 9/2006 | Osamura et al. .......... 123/48 B |
| 7,191,746 B2 * | 3/2007 | Nakamura ............... 123/179.3 |
| 7,320,307 B2 * | 1/2008 | Trask et al. ................. 123/435 |
| 7,360,513 B2 * | 4/2008 | Takemura et al. ......... 123/48 B |
| 7,451,754 B2 * | 11/2008 | Yasui et al. .................. 123/681 |
| 7,703,424 B2 * | 4/2010 | Nakamura et al. ....... 123/90.16 |
| 2006/0180118 A1 * | 8/2006 | Takemura et al. ........ 123/197.4 |
| 2007/0225892 A1 * | 9/2007 | Yasui et al. .................. 701/104 |

FOREIGN PATENT DOCUMENTS

| JP | 2004-34816 | 2/2004 |
| JP | 2005-163741 | 6/2005 |
| JP | 2006-97660 | 4/2006 |

* cited by examiner

*Primary Examiner*—John T Kwon
(74) *Attorney, Agent, or Firm*—Drinker Biddle & Reath LLP

(57) ABSTRACT

An engine load estimating apparatus, including an actuator that changes a position of a top dead center of a piston of the engine, and a controller in communication with the actuator. The controller detects a drive output of the actuator when the actuator changes the position of the top dead center of the piston, and estimates the load of the engine based on the detected drive output of the actuator.

12 Claims, 12 Drawing Sheets

ENGINE LOAD ESTIMATING APPARATUS AND ENGINE LOAD ESTIMATING METHOD

CROSS-REFERENCE TO RELATED APPLICATIONS

This application claims priority to Japanese Patent Application No. 2007-064994, filed Mar. 14, 2007, the disclosure of which is incorporated by reference herein in the entirety.

BACKGROUND OF THE INVENTION

1. Field of the Invention

The present invention relates to an apparatus and a method for estimating a load of an engine having an actuator which can change a top dead center position of a piston.

2. Description of Related Art

Conventionally, a cylinder-internal pressure sensor is used for detecting a load of an engine. To use the cylinder-internal pressure sensor, however, since a space in which the cylinder-internal pressure sensor is disposed is required in a combustion chamber, a shape for the combustion chamber that is most suitable for combustion efficiency can not be employed. The cylinder-internal pressure sensor is also expensive.

The present invention has been accomplished in view of such a conventional problem, and it is an object of the invention to provide an engine load estimating apparatus and an engine load estimating method that estimates an engine load (output torque of the engine and a cylinder-internal pressure) without using a special-purpose sensor.

BRIEF SUMMARY OF THE INVENTION

In an embodiment, the invention provides an engine load estimating apparatus, including an actuator that changes a position of a top dead center of a piston of the engine, and a controller in communication with the actuator. The controller detects a drive output of the actuator when the actuator changes the position of the top dead center of the piston, and estimates the load of the engine based on the detected drive output of the actuator.

In another embodiment, the invention provides an engine load estimating method, including driving an actuator during operation of the engine to change a position of a top dead center of a piston, detecting a drive output of the actuator, detecting an operation state of the actuator, and estimating the engine load based on the detected drive output of the actuator and the operation state of the actuator.

According to the invention, since the engine load is estimated based on the drive output of the actuator which is driven for changing the top dead center position of the piston during the operation of the engine, the engine load can be estimated without using a special-purpose sensor.

BRIEF DESCRIPTION OF THE DRAWINGS

The accompanying drawings, which are incorporated herein and constitute part of this specification, illustrate preferred embodiments of the invention, and together with the general description given above and the detailed description given below, serve to explain features of the invention.

DETAILED DESCRIPTION OF THE PREFERRED EMBODIMENTS

First Embodiment

Figure 1:
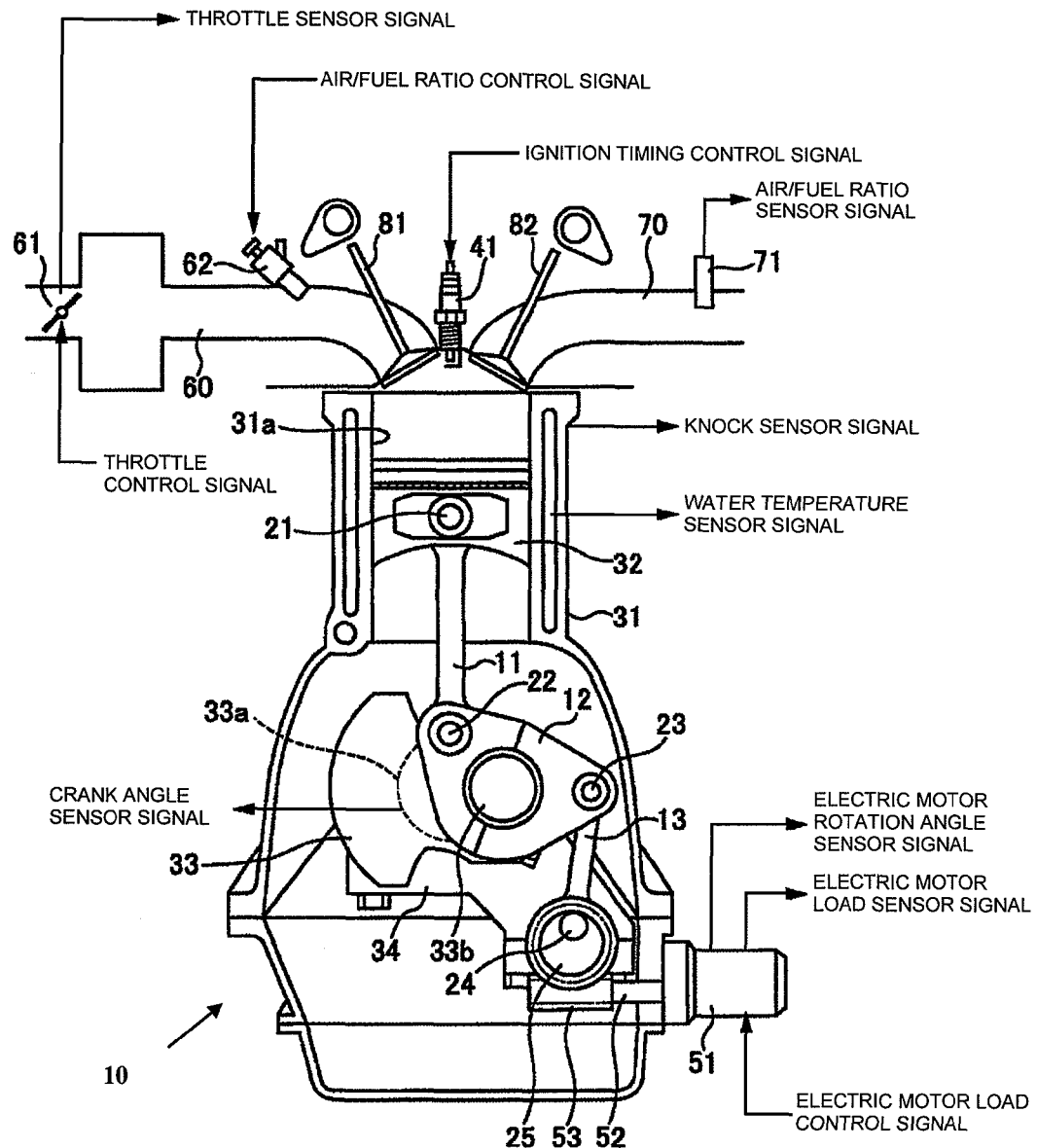
FIG. 1 is a diagram showing a variable compression ratio engine which uses an engine load estimating apparatus according to an embodiment of the present invention.

FIG. 1 is a diagram showing a variable compression ratio engine which uses an engine load estimating apparatus according to an embodiment of the invention.

First, an engine using an engine load estimating apparatus according to the invention will be explained. This engine is a variable compression ratio engine by a multi-link mechanism in which a piston and a crankshaft are connected to each other through two links (hereinafter referred to as "multi-link type variable compression ratio engine").

In a multi-link type variable compression ratio engine 10, a piston 32 and a crankshaft 33 are connected to each other through two links (an upper link (first link) 11 and a lower link (second link) 12), and a control link (third link) 13 controls the lower link 12 to change a machine compression ratio.

An upper end of the upper link 11 is connected to the piston 32 through a piston pin 21, and a lower end of the upper link 11 is connected to one end of the lower link 12 through a connection pin 22. The piston 32 receives a combustion pressure (cylinder-internal pressure), and reciprocates in a cylinder 31a of a cylinder block 31.

One end of the lower link 12 is connected to the upper link 11 through the connection pin 22, and the other end of the lower link 12 is connected to the control link 13 through a connection pin 23. A crankpin 33b of the crankshaft 33 is inserted into a connection hole formed in the lower link 12 at its substantially central portion, and the lower link 12 rocks around the crankpin 33b as a center axis. The lower link 12 is divided into left and right members. The crankshaft 33 includes a plurality of journals 33a and crankpins 33b. Each journal 33a is rotatably supported by the cylinder block 31 and a rudder frame 34. The crankpin 33b is deviated from the journal 33a by a predetermined amount, and the lower link 12 is rockably connected to this portion.

The control link 13 is connected to the lower link 12 through the connection pin 23. The other end of the control link 13 is connected to a control shaft 25 through a connection pin 24. The control link 13 rocks around the connection pin 24. The control shaft 25 is formed with a thread, and the thread meshes with a worm gear 53 provided on a rotation shaft 52 of an electric motor (actuator) 51. The control shaft 25 is rotated by the electric motor 51, and the connection pin 24 is moved.

An intake passage 60 of the engine 10 is provided with a throttle valve 61 and a fuel injection valve 62. The throttle valve 61 adjusts an amount of new air in accordance with its opening degree. The fuel injection valve 62 injects fuel.

A discharge passage 70 of the engine 10 is provided with an air/fuel ratio sensor 71. The air/fuel ratio sensor 71 detects an air/fuel ratio of exhaust gas.

Figure 2:
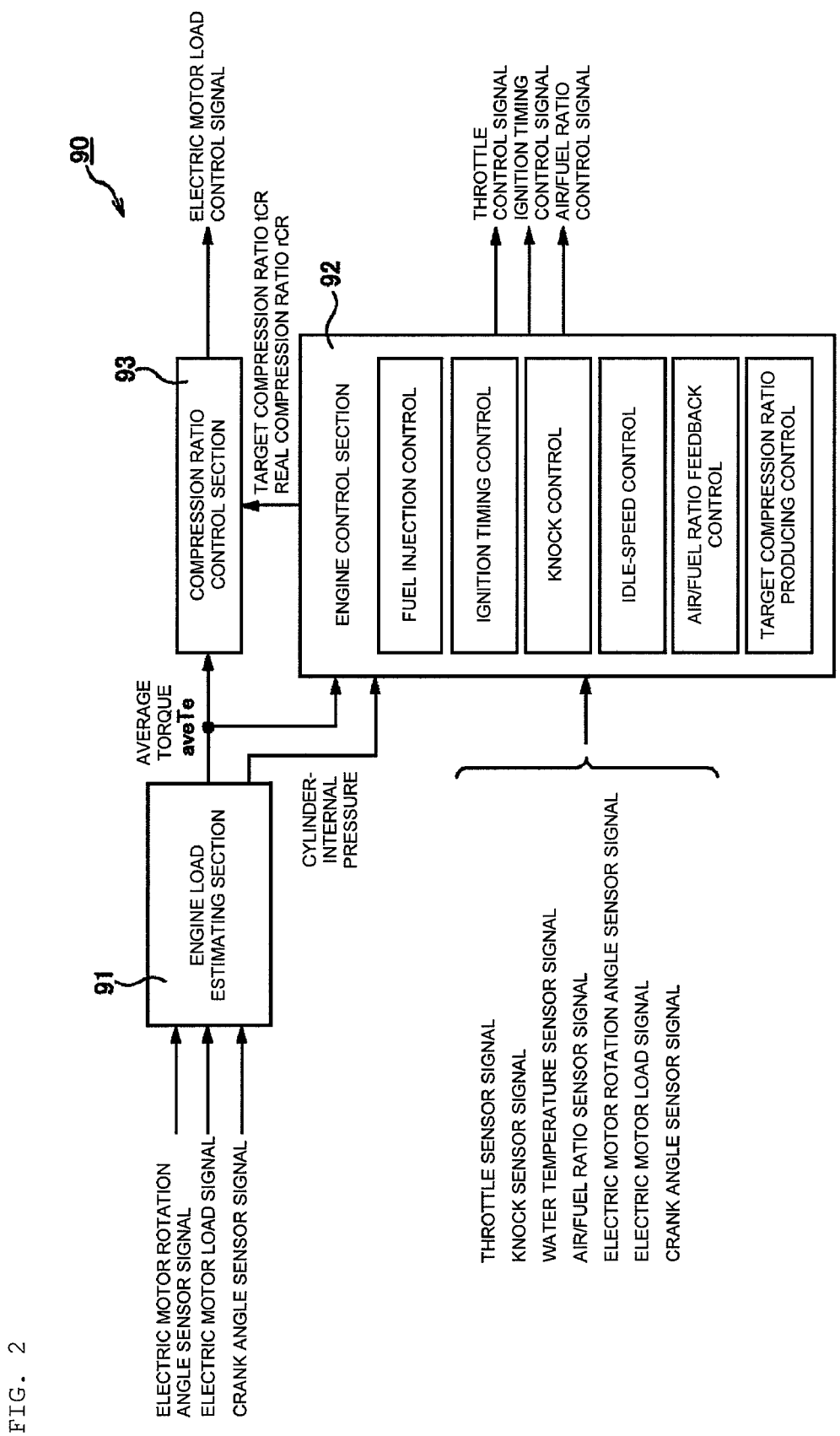
FIG. 2 is a block diagram of a function of control of a controller.

FIG. 2 is a block diagram of a function of control of a controller.

A controller 90 includes an engine load estimating section 91, an engine control section 92 and a compression ratio control section 93.

The engine load estimating section 91 estimates an engine load (e.g. output torque of the engine and a cylinder-internal pressure) based on a sensor signal of a rotation angle of the electric motor, an output torque signal of the electric motor, and a sensor signal of a crank angle of the engine.

The engine control section 92 outputs a throttle control signal, an ignition timing control signal and an air/fuel ratio control signal based on an engine load signal, a throttle sensor signal, a knock sensor signal, a water temperature sensor signal, an air/fuel ratio sensor signal, a rotation angle sensor signal of the electric motor, an output torque signal of the electric motor and a crank angle sensor signal of the engine. The engine control section 92 also calculates a target compression ratio tCR and a real compression ratio rCR. Since a compression ratio is mechanically determined by a link position, the multi-link type variable compression ratio engine 10 can calculate the real compression ratio rCR based on the rotation angle sensor signal of the electric motor. When engine torque is great and there is a possibility that a vehicle suddenly starts, the engine control section 92 reduces a fuel injection amount and adjusts an air/fuel ratio, reduces a throttle opening, or retards the ignition timing and suppresses output. When the cylinder-internal pressure is high and there is a possibility of knocking, the engine control section 92 reduces the target compression ration.

The compression ratio control section 93 outputs an output torque control signal of the electric motor based on the engine torque, the target compression ratio tCR and the real compression ratio rCR, rotates and drives the electric motor 51 to rotate the control shaft 25 and changes the compression ratio.

The controller 90 includes a microcomputer including a central processing unit (CPU), a read-only memory (ROM), a random-access memory (RAM) and an input/output interface (I/O interface). The controller 90 may include a plurality of microcomputers.

Figure 3:
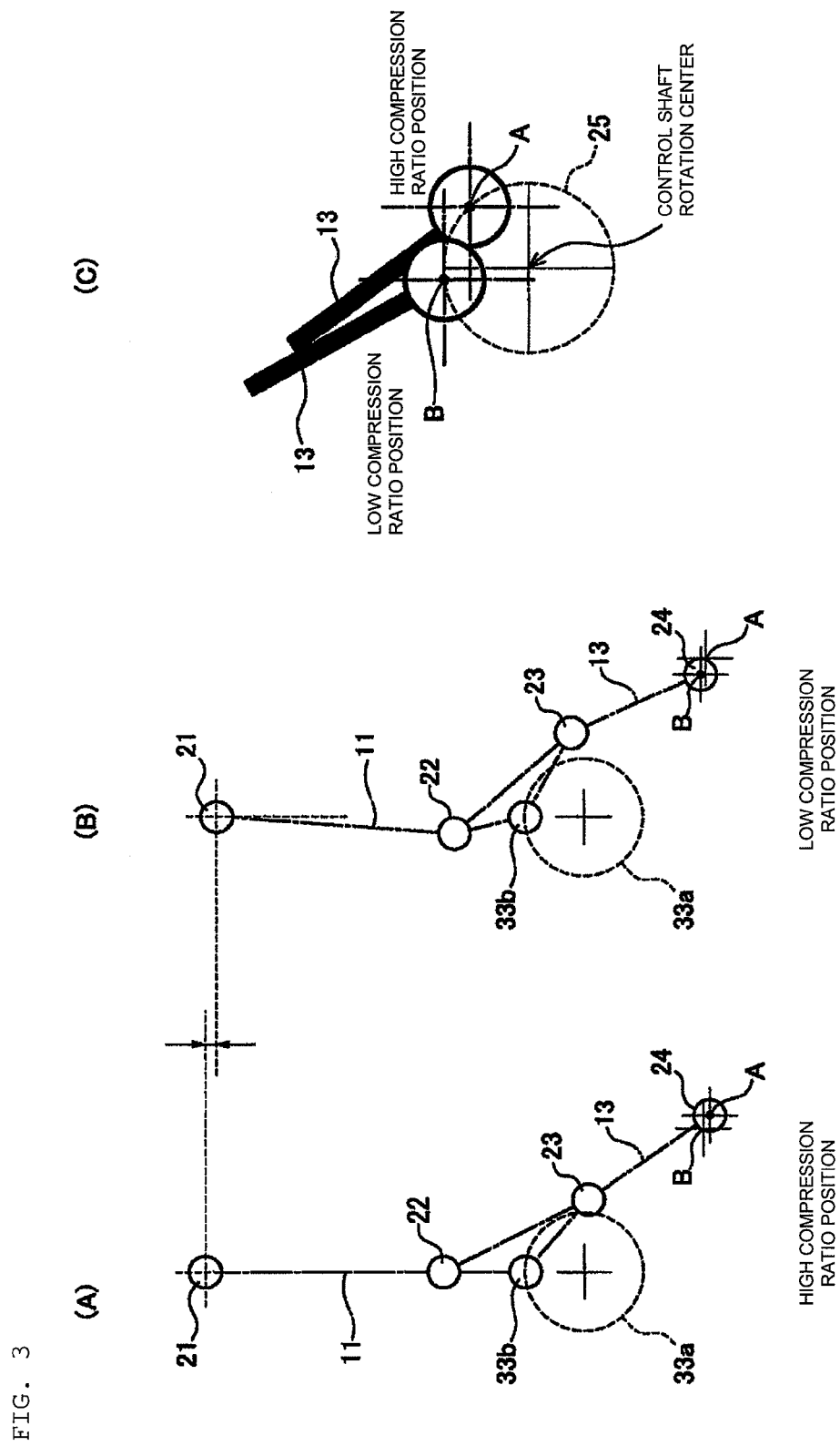
FIGS. 3A, 3B and 3C are diagrams for explaining a changing method of a compression ratio by a multi-link type variable compression ratio engine.

FIGS. 3A, 3B and 3C are diagrams for explaining a method of having a compression ratio of a multi-link type variable compression ratio engine.

The multi-link type variable compression ratio engine can change a machine compression ratio by rotating the control shaft 25 to change the position of the connection pin 24. For example, as shown in FIGS. 3A and 3C, if the connection pin 24 is brought into the position A, the top dead center position (TDC) becomes high, and the compression ratio becomes higher.

As shown in FIGS. 3B and 3C, if the connection pin 24 is brought into the position B, the control link 13 is pushed up, and the position of the connection pin 23 is brought up. Accordingly, the lower link 12 rotates in the counterclockwise direction around the crankpin 33b, the connection pin 22 is lowered, and the position of the piston 32 in the top dead center (TDC) of the piston is lowered. Therefore, the compression ratio becomes low.

Figure 4:
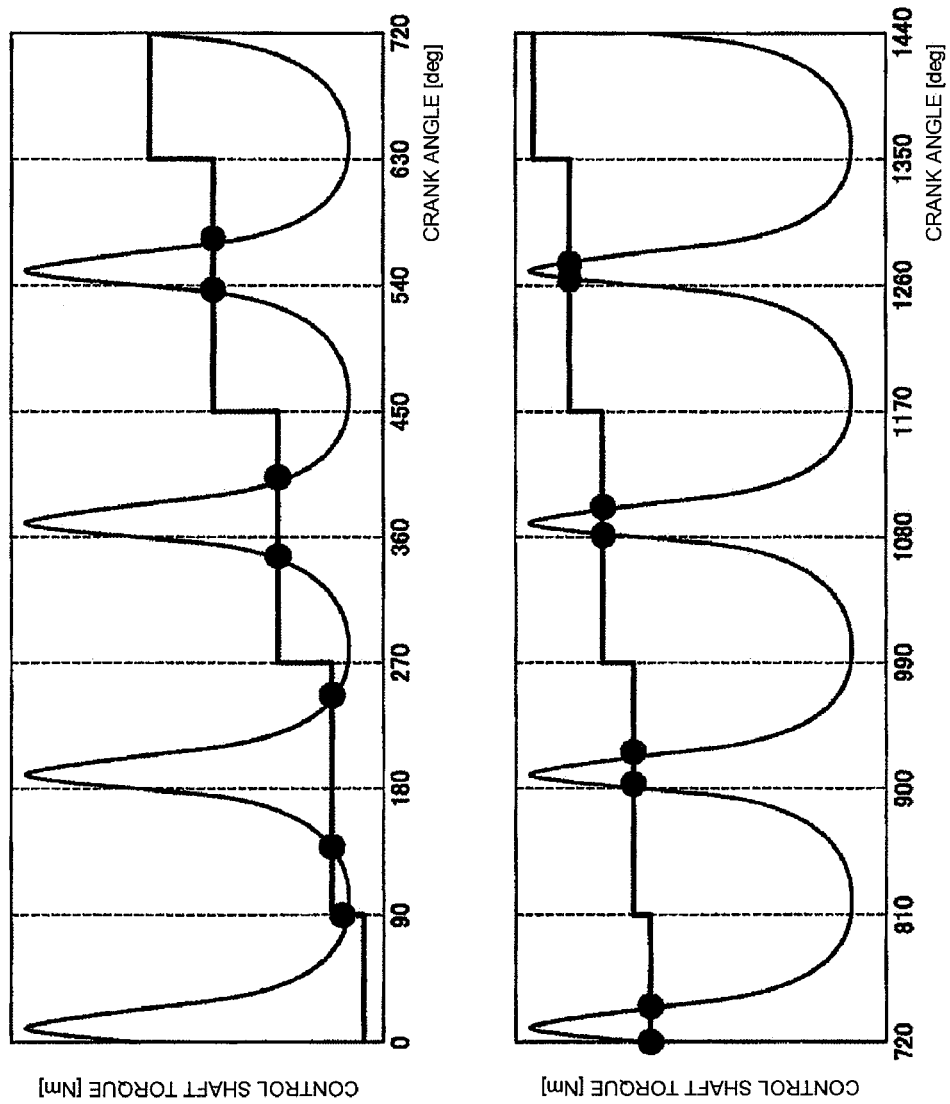
FIG. 4 is a diagram for explaining a point of the invention.

According to the invention, based on the driving force of the control shaft by the electric motor, the engine load (e.g. output torque of the engine and the cylinder-internal pressure) can be estimated without using a special-purpose sensor which detects the engine load. This will be explained with reference to FIG. 4. In FIG. 4, thick solid lines show driving torque of the control shaft (hereinafter referred to as "electric motor torque") by the electric motor. Thin solid lines show conversion torque when a downward force on the piston by the cylinder-internal pressure is transmitted to the control shaft. In the following description, this torque is referred to as cylinder-internal pressure torque. In this embodiment, the engine is an in-line four-cylinder engine. In one cycle (having a crank rotation angle of 720°), the air-fuel mixture is ignited four times in total at every 180° and the cylinder-internal pressure torque is abruptly increased accordingly.

When the electric motor torque (thick solid line) is greater than the cylinder-internal pressure torque (thin solid line), the electric motor torque rotates and drives the control shaft against the cylinder-internal pressure torque. When the electric motor torque (thick solid line) is smaller than the cylinder-internal pressure torque (thin solid line), however, the electric motor torque is beaten by the cylinder-internal pressure torque, and the control shaft can not be rotated or driven. In such a case also, since there is the worm gear 53, the electric motor is not reversely rotated by the cylinder-internal pressure torque. In such a case, the electric motor turns in a stopped state. Therefore, the instant when the electric motor starts rotating and the instant when the electric motor stops are the instant when the electric motor torque is equal to the cylinder-internal pressure torque.

These actual operational states of the electric motor are detected based on the electric motor rotation angle sensor signal, which serves as an example of an actuator operation state detecting means.

Figure 5:
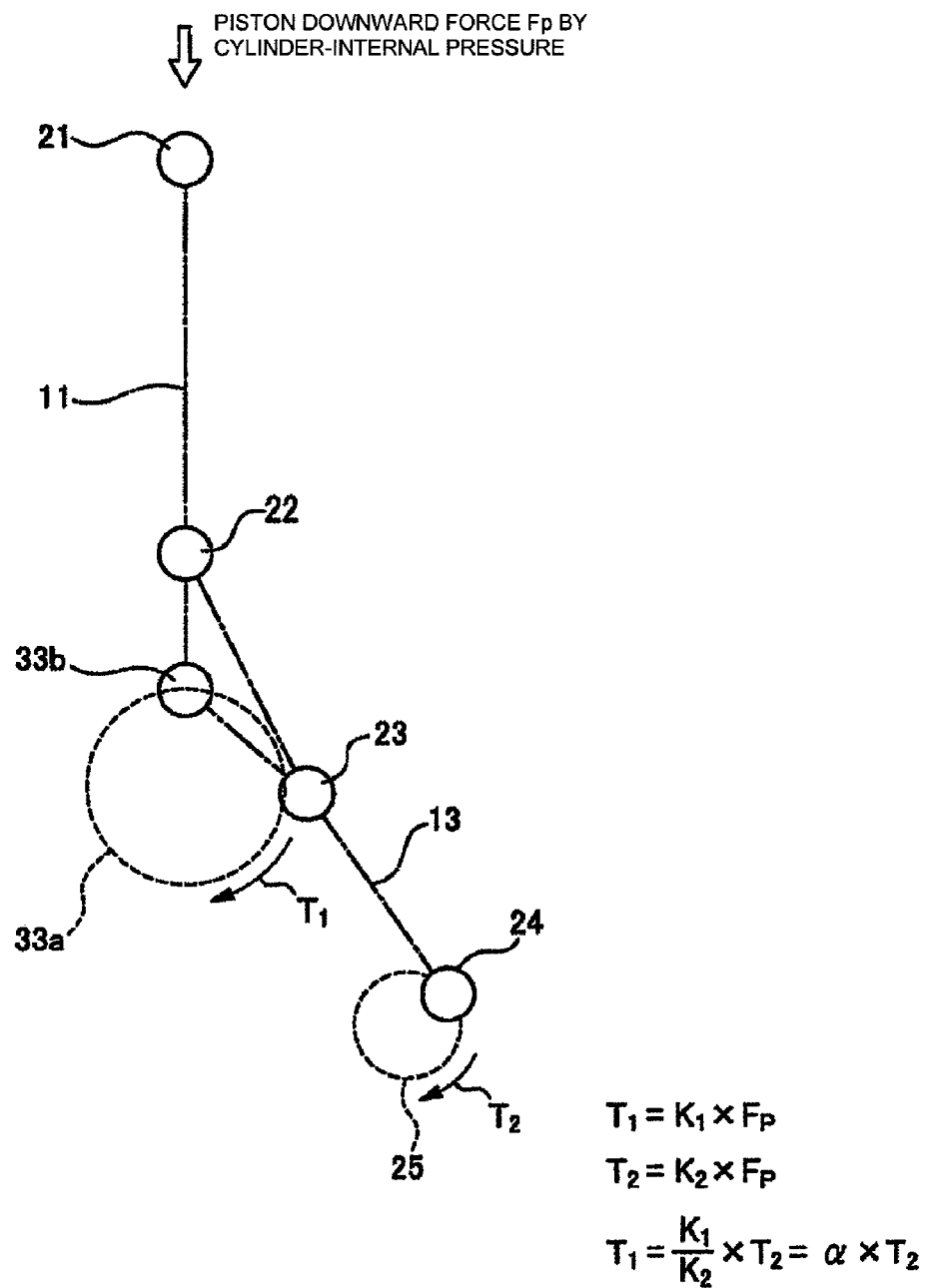
FIG. 5 is an explanatory diagram concerning a cylinder-internal pressure division ratio $\alpha$.

FIG. 5 is an explanatory diagram concerning a cylinder-internal pressure division ratio $\alpha$.

Rotation torque (engine output torque) T1 is generated in the crankshaft 33 by piston downward force Fp by the cylinder-internal pressure. The rotation torque T1 is expressed as a product of a coefficient K1 and the piston downward force Fp, i.e., the product is expressed with the following equation (1).

[Equation 1]

$$T1 = K1 \times Fp \quad (1)$$

Cylinder-internal pressure torque T2 is generated in the control shaft 25 by the piston downward force Fp by the cylinder-internal pressure. The rotation torque T2 is expressed as a product of a coefficient K2 and the piston downward force Fp, i.e., the product is expressed with the following equation (2).

[Equation 2]

$$T2 = K2 \times Fp \quad (2)$$

Therefore, there is a relation shown in the following equation (3) between the rotation torque T1 and the cylinder-internal pressure torque T2.

[Equation 3]

$$T1 = (K1/K2) \times T2 = \alpha \times T2 \quad (3)$$

Here, $\alpha$ represents a cylinder-internal pressure division ratio. This cylinder-internal pressure division ratio $\alpha$ is varied by the crank angle and the compression ratio as described later. Therefore, an experiment may previously be carried out to set a characteristic map, and the cylinder-internal pressure division ratio α may be determined based on the characteristic map.

The electric motor torque can be obtained by adding a current value to a torque coefficient KT.

From the above operation, when a small electric motor torque, such that the electric motor can stop instantaneously, is output to the electric motor, the engine load (e.g. output torque of the engine and cylinder-internal pressure) may be estimated based on the electric motor torque at the instant when the electric motor is stopped.

According to the above-described method, the instantaneous torque of the engine can be found. When a relation between the electric motor torque (electric motor output), and timing at which the electric motor stops (such as crank angle and time) and/or timing at which the electric motor starts rotating, (such as crank angle and time) is previously stored while associating the relation with engine load (engine output torque and cylinder-internal pressure), the average torque of the engine can be estimated by checking the actual value against the relation. Further when the electric motor torque is varied, the electric motor stop crank angle is detected whenever the torque is varied, and a variation pattern of the engine output is estimated based on the detected angles, it is possible to estimate the average torque of the engine precisely.

According to the multi-link type variable compression ratio engine shown in FIG. 1, when the compression ratio is to be increased, the piston position is lifted upward as explained with reference to FIGS. 3A, 3B and 3C. Therefore, the electric motor rotates and drives the control shaft 25 against the piston downward force Fp. That is, the piston position is adjusted only by the electric motor torque. When the compression ratio is to be lowered, however, the piston position is lowered. Therefore, there is a possibility that the piston downward force Fp is added to the force of the electric motor for rotating and driving the control shaft 25, and that the piston position is adjusted by electric motor torque smaller than torque which is actually required for adjusting the piston position. Hence, in the embodiment, the engine load (output torque of the engine and the cylinder-internal pressure) is estimated based on electric motor torque at the instant when the electric motor is stopped to increase the compression ratio.

Figure 6:
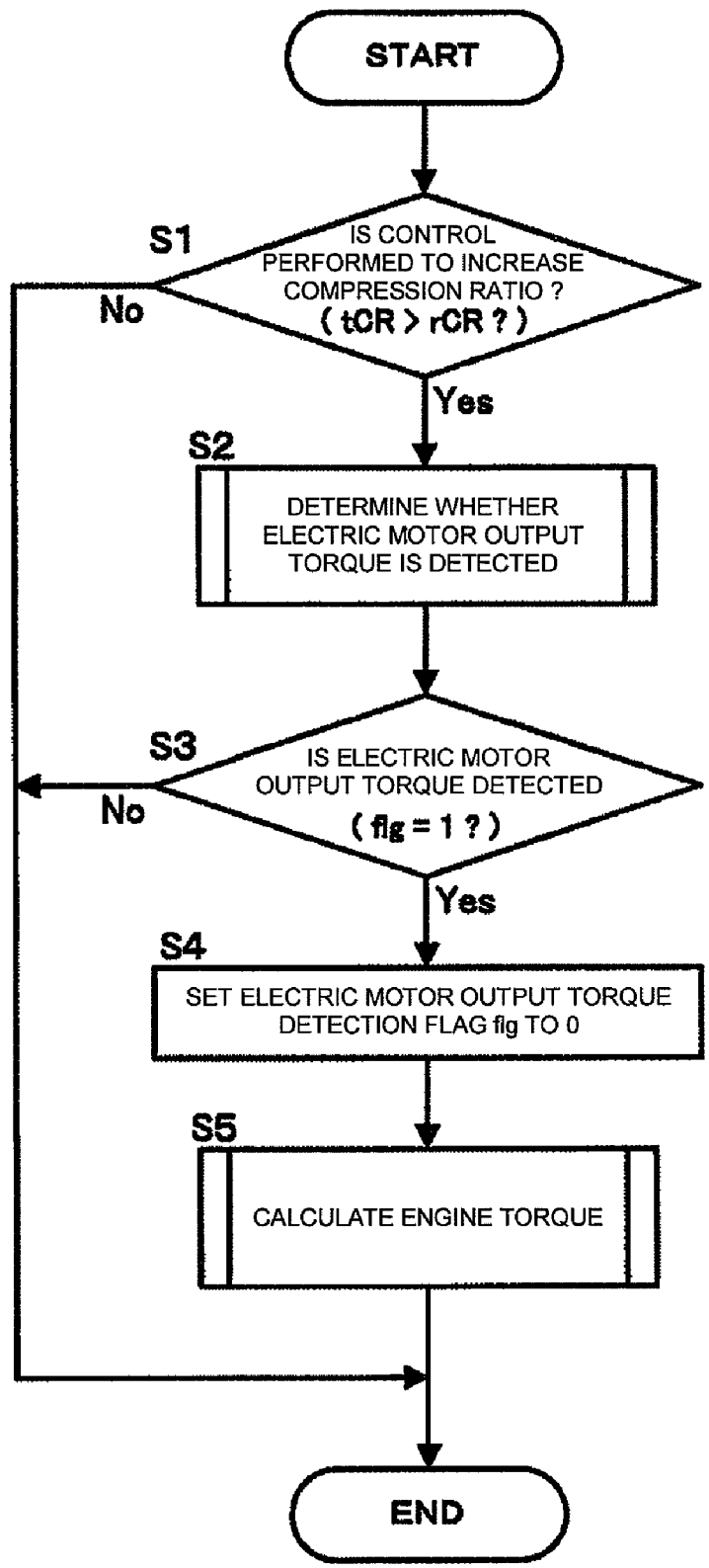
FIG. 6 is a main flowchart for explaining control contents of a controller in a first embodiment of the engine load estimating apparatus.

Control logic of the controller 90 will be explained in more detail with reference to the flowchart in FIG. 6. FIG. 6 is a main flowchart for explaining control content of the controller in a first embodiment of the engine load estimating apparatus. The controller repeatedly executes this processing at very short time (e.g., 10 ms) cycles.

In step S1, the controller 90 determines whether control is performed to increase the compression ratio. When the target compression ratio tCR is greater than the real compression ratio rCR, it is determined that the control is performed to increase the compression ratio. When the control is performed to increase the compression ratio, the procedure is proceeded to step S2, otherwise, the procedure is once canceled.

In step S2, the controller 90 determines whether output torque of the electric motor 51 is detected, which is described later in more detail.

In step S3, the controller 90 once cancels the procedure until the output torque of the electric motor 51 is detected, and when the output torque is detected, the procedure is proceeded to step S4.

In step S4, the controller 90 sets an electric motor output torque detection flag flg to 0.

In step S5, the controller 90 calculates torque of the engine.

Figure 7:
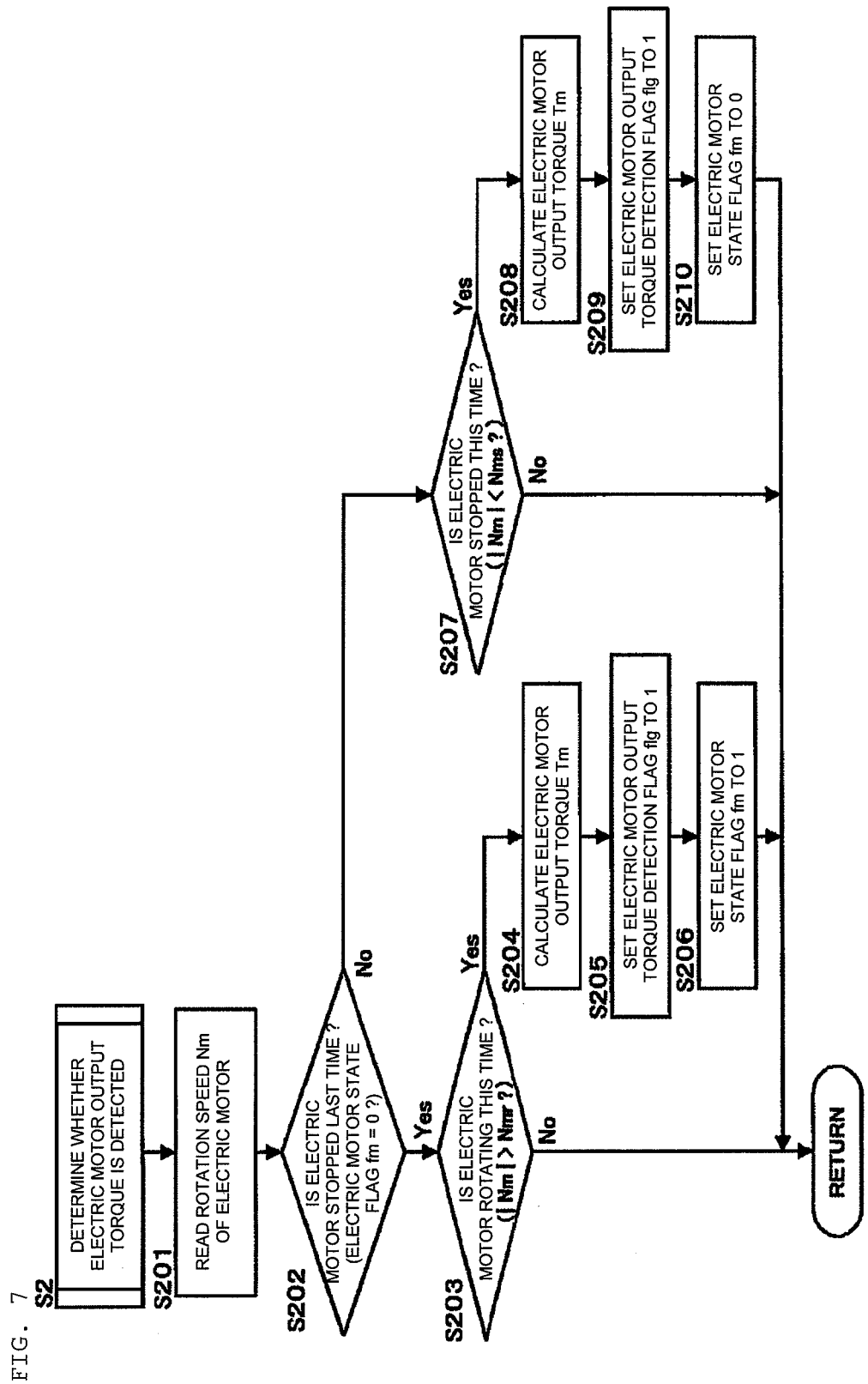
FIG. 7 is a flowchart showing a sub-routine of electric motor output torque detection determination.

FIG. 7 is a flowchart showing a sub-routine of the electric motor output torque detection determination.

In step S201, the controller 90 reads a rotation speed Nm of the electric motor 51 based on a signal of the electric motor rotation angle sensor.

In step S202, the controller 90 determines whether the electric motor stopped last time based on the electric motor state flag. If the electric motor stopped last time, the procedure is proceeded to step S203, otherwise, the procedure is proceeded to step S207.

In step S203, the controller 90 determines whether the electric motor rotates this time. If the rotation speed Nm of the electric motor 51 is greater than a rotation determination value Nmr, it is determined that the electric motor rotates. The procedure is canceled until the electric motor rotates, and when the electric motor rotates, the procedure is proceeded to step S204.

In step S204, the controller 90 calculates output torque Tm of the electric motor 51. The output torque Tm can be obtained by adding a current value to the torque coefficient KT as described above.

In step S205, the controller 90 sets the electric motor output torque detection flag flg to 1.

In step S206, the controller 90 sets the electric motor state flag fm to 1.

In step S207, the controller 90 determines whether the electric motor stops this time. If the rotation speed Nm of the electric motor 51 is smaller than the stop determination value Nms, it is determined that the electric motor stops. The procedure is canceled until the electric motor stops, and when the electric motor stops, the procedure is proceeded to step S208.

In step S208, the controller 90 calculates the output torque Tm of the electric motor 51. The output torque Tm can be obtained by adding the current value to the torque coefficient KT as described above.

In step S209, the controller 90 sets the electric motor output torque detection flag flg to 1.

In step S210, the controller 90 sets the electric motor state flag fm to 0.

Figure 8:
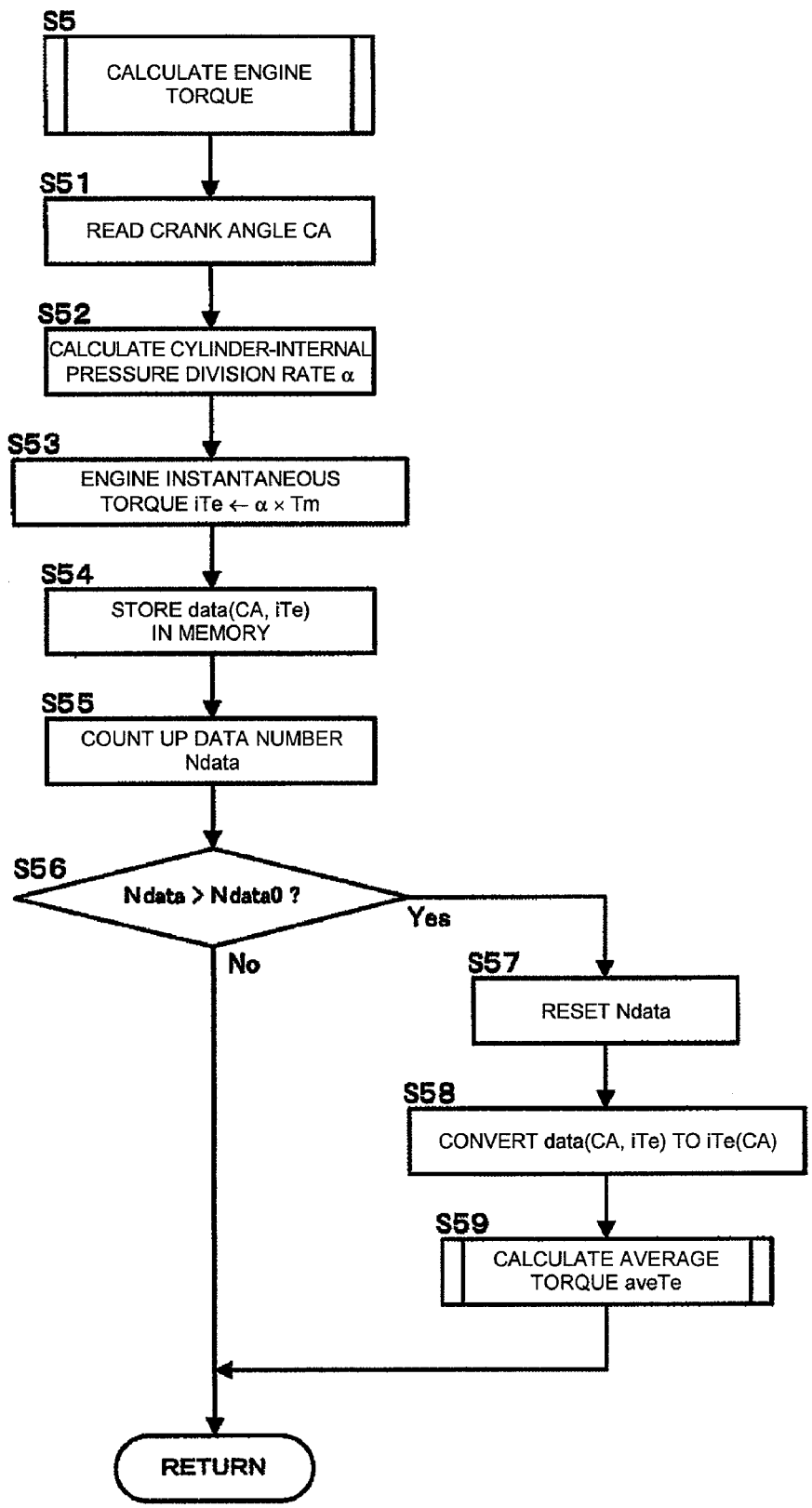
FIG. 8 is a flowchart showing a sub-routine of an engine torque calculation.

FIG. 8 is a flowchart showing a sub-routine of an engine torque calculation.

In step S51, the controller 90 reads a crank angle CA based on the crank angle sensor signal.

Figure 9:
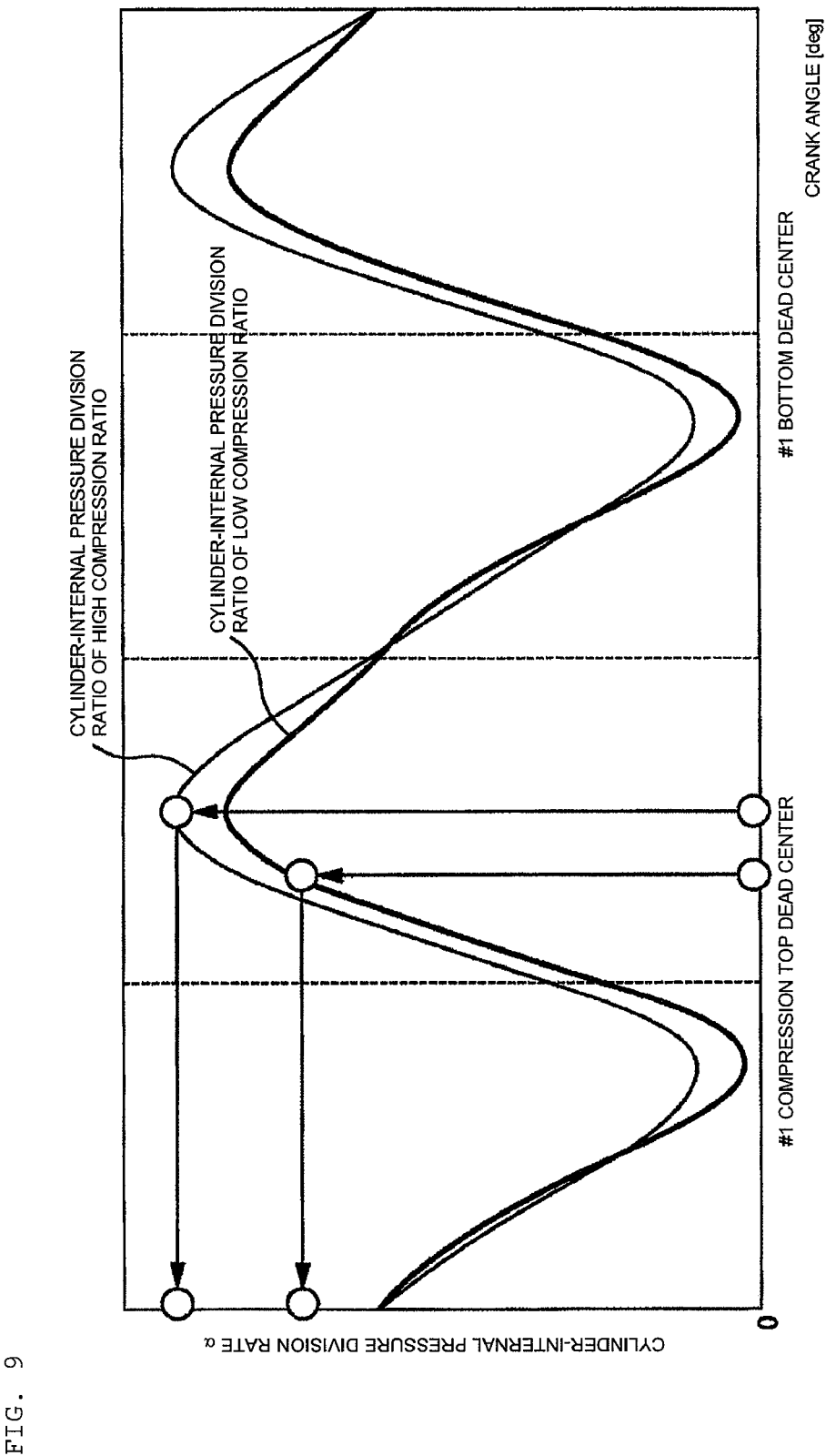
FIG. 9 is a diagram showing one example of a characteristic map of the cylinder-internal pressure division ratio $\alpha$.

In step S52, the controller 90 obtains the cylinder-internal pressure division ratio α based on, for example, the characteristic map shown in FIG. 9 stored in the ROM which is previously set through an experiment.

In step S53, the controller 90 multiplies the cylinder-internal pressure division ratio α and the electric motor output torque Tm to obtain engine instantaneous torque iTe. When the control shaft and the electric motor are connected to each other through a reduction gear, like a case in which specified torque of the electric motor is reduced to make the electric motor compact, the electric motor output torque Tm is multiplied by a speed reduction ratio Gr, and a resultant value is multiplied by the division ratio α, and a resultant value is used as the instantaneous torque iTe.

In step S54, the controller 90 stores, in a memory, the engine instantaneous torque iTe per crank angle CA.

In step S55, the controller 90 counts up the number of data sets Ndata stored in the memory.

In step S56, the controller 90 determines whether the counted up number of data sets Ndata exceeds a reference value Ndata0. The procedure is canceled once and proceeds to step S57 when the counted up number of data sets Ndata exceeds the reference value Ndata0.

In step S57, the controller 90 resets the number of data sets Ndata.

In step S58, the controller 90 obtains a torque variation pattern iTe(CA) based on the engine instantaneous torque iTe per crank angle CA stored in the memory.

In step S59, the controller 90 calculates the average torque aveTe based on the torque variation pattern iTe(CA), with the following equation (4).

[Equation 4]

$$aveTe = \frac{\int_0^{CAmax} iTe(CA) dCA}{CAmax} \quad (4)$$

Next, a state when the control of the flowchart is executed will be explained.

Figure 10:
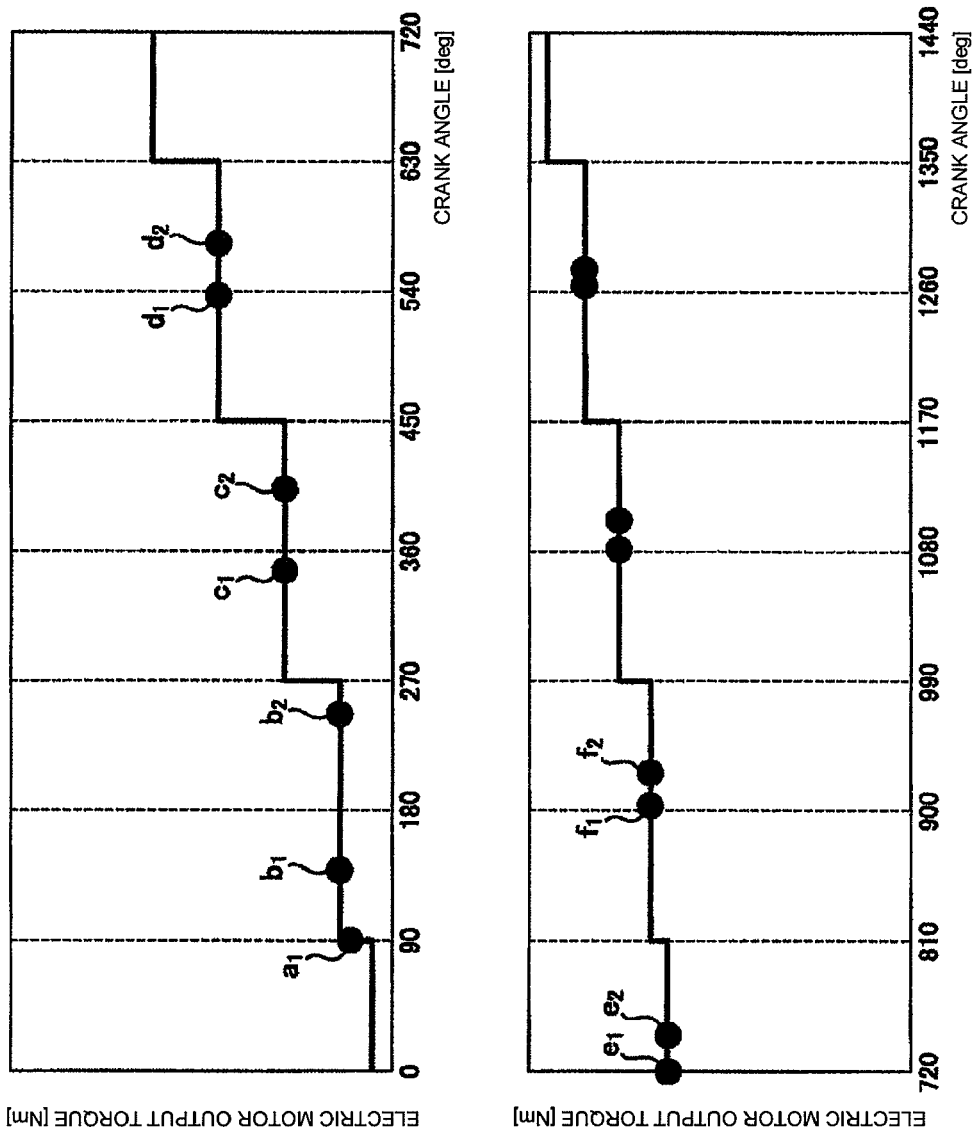
FIG. 10 is a diagram showing a relation between a crank angle and electric motor output torque.
Figure 11:
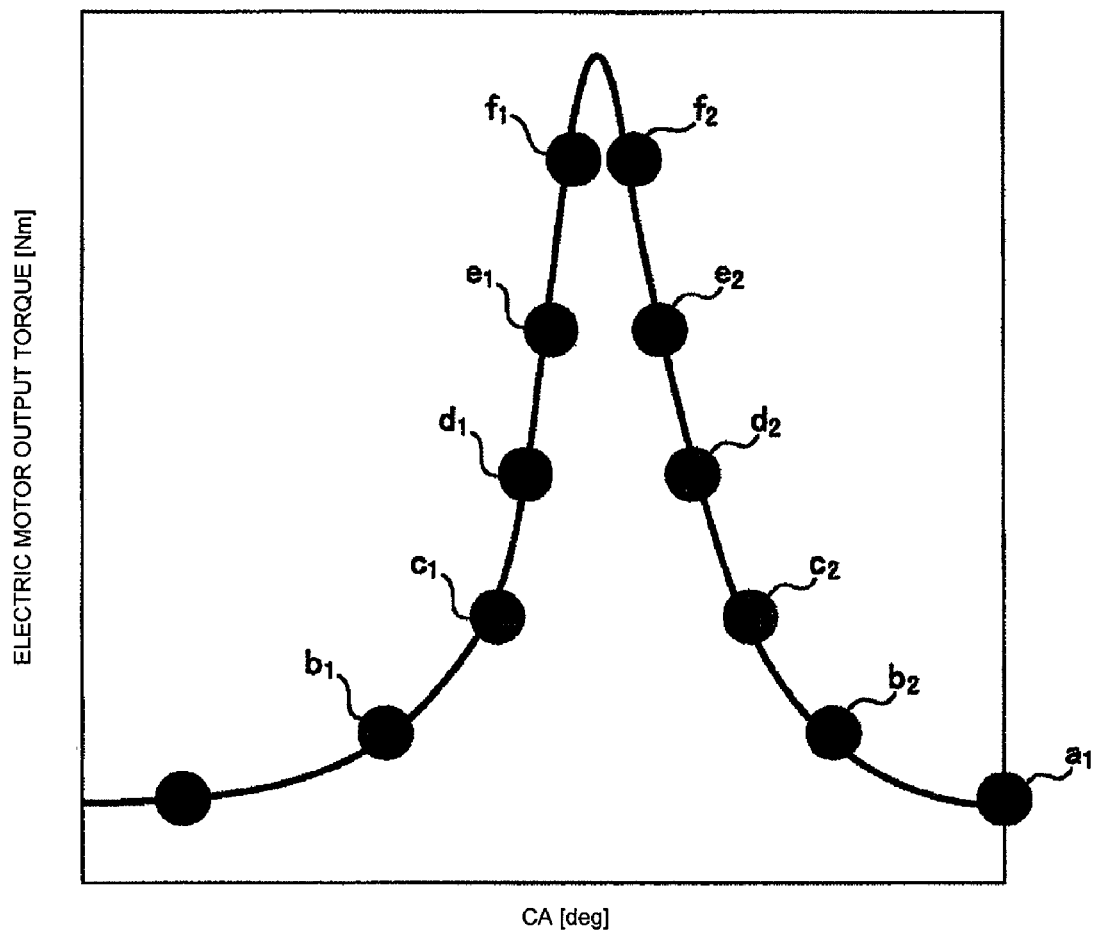
FIG. 11 is a diagram showing a distribution of the electric motor output torque.

The controller 90 performs control when the control is performed to increase the compression ratio (step S1). The controller 90 reads the rotation speed Nm of the electric motor 51 (step S201) to obtain the electric motor output torque Tm at the instant when the rotation is started (steps S202, S203 and S204), and reads the crank angle CA at that time (step S51). The controller 90 also reads the rotation speed Nm of the electric motor (step S201) to obtain the electric motor output torque Tm at the instant when the rotation is stopped (steps S202, S207 and S208), and reads the crank angle CA at that time (step S51). The relation between the crank angle CA and the electric motor output torque Tm is shown in FIG. 10. FIG. 11 shows the data sets which are superimposed whenever the electric motor output torque Tm becomes constant. A variation pattern of the engine load when the electric motor stops may be obtained. The average torque is obtained from the variation pattern.

As explained above in detail, according to the embodiment, since the engine load is estimated based on the output of the actuator (electric motor) which changes the position of the piston top dead center, a special-purpose sensor for detecting the engine load is unnecessary, and the production cost can be reduced.

The piston top dead center is moved upward, and the engine load is estimated based on the output of the actuator (electric motor) when the compression ratio is increased. Therefore, the engine load can be estimated precisely.

When the piston top dead center is moved upward, the drive output of the actuator (electric motor) is gradually increased, and the engine instantaneous torque is obtained based on the output when the actuator (electric motor) starts rotating or the rotation is completed. Therefore, the variation pattern of the engine instantaneous torque can be found and the engine average torque can be estimated.

Second Embodiment

Figure 12:
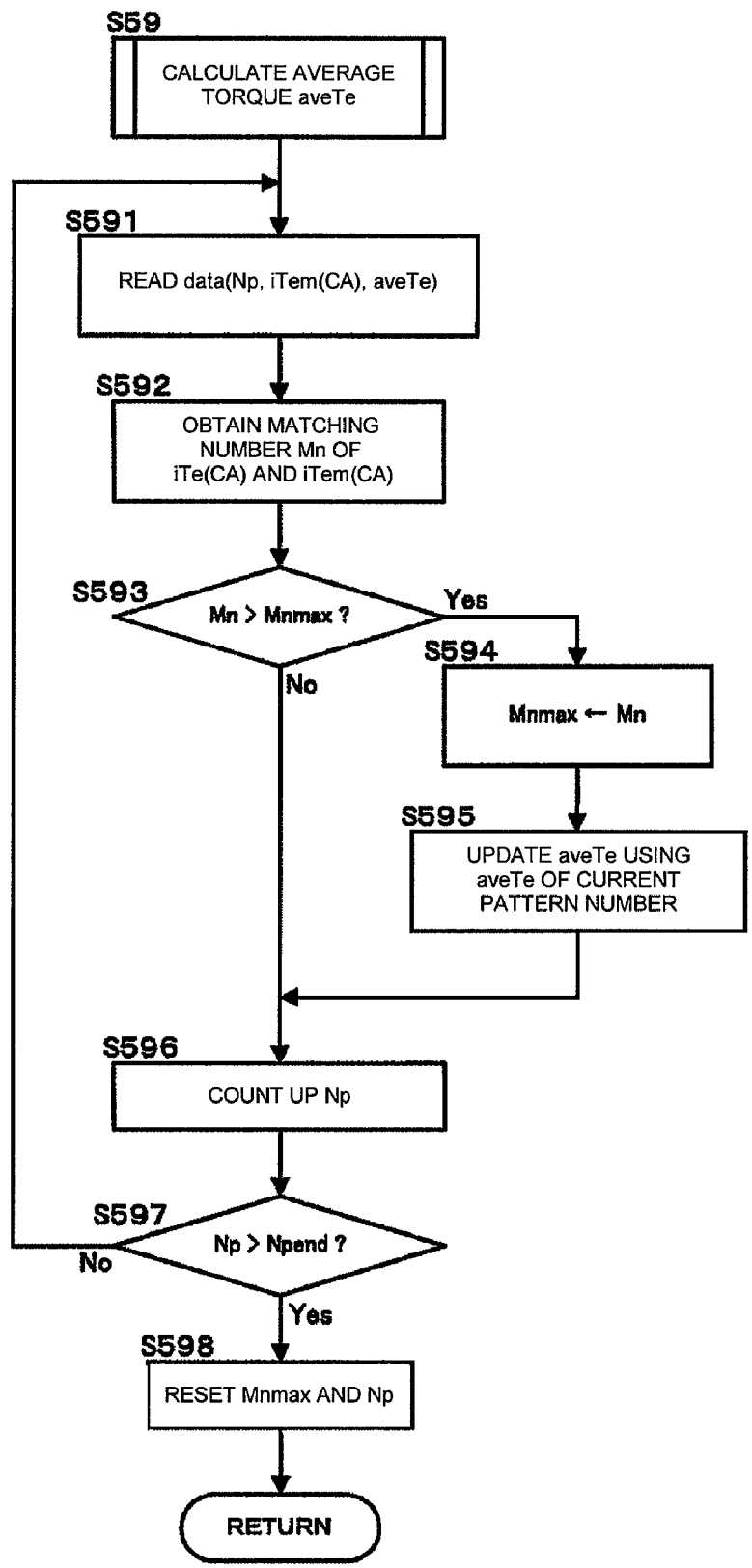
FIG. 12 is a flowchart showing a sub-routine of average torque calculation processing in a second embodiment of the engine load estimating apparatus of the invention.

FIG. 12 is a flowchart showing a sub-routine of average torque calculation processing in a second embodiment of the engine load estimating apparatus of the invention.

Elements which have the same functions as those in the previous embodiment are designated with the same symbols, and redundant explanation will be omitted appropriately.

In the first embodiment, the torque variation pattern iTe(CA) was obtained based on the engine instantaneous torque iTe per crank angle CA stored in the memory, and the average torque aveTe was calculated using equation (4). A model iTem(CA) of the torque variation pattern is previously stored in the ROM, and the matching number indicating how much the actual pattern iTe(CA) matches with the model pattern iTem(CA) is obtained. A model pattern having a high matching number may be determined as the actual pattern and the average torque aveTe of that model pattern may be employed. Control logic of this method will be explained in more detail with reference to the flowchart in FIG. 12.

In step S591, the controller 90 reads data (Np, iTem(CA), aveTe) which is previously stored in the ROM. Here, Np represents the number of the model patterns, iTem(CA) represents an instantaneous torque pattern with respect to the crank angle CA of that model pattern, and aveTe represents the average torque of that model pattern.

In step S592, the controller 90 obtains the matching number Mn indicating how much the actual pattern iTe(CA) matches the model pattern iTem(CA). It is not necessary that the matching is exact. If the matching error is within permissible range, it may be determined such that the pattern matches, and it may be counted as the matching number.

In step S593, the controller 90 determines whether the matching number Mn of this time is greater than the maximum matching number Mnmax up to the current time. When Mn is greater than Mnmax, the procedure is proceeded to step S594, otherwise, the procedure is proceeded to step S596.

In step S594, the controller 90 updates the maximum matching number Mnmax with the matching number Mn of the current time.

In step S595, the controller 90 updates the average torque aveTe with the average torque of the current pattern number.

In step S596, the controller 90 counts up the model pattern number Np.

In step S597, the controller 90 determines whether the model pattern number Np exceeds the end determination value Npend. The procedure is proceeded to step S591 until the model pattern number Np exceeds the end determination value Npend, and when the model pattern number Np exceeds the end determination value Npend, the procedure is proceeded to step S598.

In step S598, the controller 90 resets the maximum matching number Mnmax and the model pattern Number Np, and the procedure is canceled.

According to the embodiment, since the average torque aveTe can be calculated based on data which is previously stored in the ROM, the processing is carried out swiftly. Even if noise is added to the engine instantaneous torque obtained by the calculation, average torque aveTe from which the influence of noise is eliminated can be calculated.

While the invention has been disclosed with reference to certain preferred embodiments, numerous modifications, alterations, and changes to the described embodiments are possible without departing from the sphere and scope of the invention, as defined in the appended claims and equivalents thereof.

For example, output torque of the engine is shown as an example, but a cylinder-internal pressure of the engine can also be obtained by the same technique. That is, the higher the cylinder-internal pressure, the higher the output torque of the engine becomes, and the lower the cylinder-internal pressure, the lower the output torque of the engine becomes. The cylinder-internal pressure and the output torque of the engine are closely related to each other. It is possible to estimate the cylinder-internal pressure essentially in the same manner by changing the map used for estimation to a map for calculating the cylinder-internal pressure. Since the cylinder-internal pressure and the output torque of the engine are closely related to each other as described above, not only the output torque of the engine indicated herein, but also the cylinder-internal pressure, may be included in the "engine load" as used herein.

The in-line four-cylinder engine is only one example, and the invention can be applied to an engine having a smaller number or a greater number of cylinders.

When the piston top dead center is moved upward, the drive output of the actuator (electric motor) is gradually increased stepwise, however, the drive output may be gradually increased at a constant rate (i.e. in a monotone increasing manner), and further, the increasing rate need not be a constant as long as the drive output is increased gradually to be greater than the last time. The electric motor torque need not be a specific value, and simple control like the monotone increase can be carried out by employing the method for estimating the variation pattern.

Although the electric motor is described as an example of the actuator, the actuator may be a hydraulic actuator. That is, the actuator is not limited as long as it can detect output.

Accordingly, it is intended that the invention not be limited to the described embodiments, but that it have the full scope defined by the language of the following claims.

The invention claimed is:

1. An engine load estimating apparatus, comprising:
   an actuator that changes a position of a top dead center of a piston of the engine; and
   a controller in communication with the actuator;
   wherein the controller detects a drive output of the actuator when the actuator changes the position of the top dead center of the piston, and estimates the load of the engine based on the detected drive output of the actuator.

2. The engine load estimating apparatus according to claim 1, further comprising:
   an actuator operation state detecting sensor which detects an operation state of the actuator;
   wherein the controller estimates the engine load based on the detected drive output of the actuator and the operation state of the actuator.

3. The engine load estimating apparatus according to claim 2, wherein
   the actuator operation state detecting sensor detects that the actuator starts the operation or finishes the operation; and
   the controller estimates the engine load based on the detected drive output of the actuator when the actuator starts the operation or finishes the operation.

4. The engine load estimating apparatus according to claim 1, wherein
   the controller defines a ratio between a crankshaft rotation torque generated by a piston downward force caused by the cylinder-internal pressure, and torque trying to move the actuator, as a cylinder-internal pressure division ratio; and the controller estimates the load of the engine based on the detected drive output of the actuator and the cylinder-internal pressure division ratio.

5. The engine load estimating apparatus according to claim 1, further comprising:
   a first link connected to the piston;
   a second link connected to a crankpin of a crankshaft of the engine and connected to the first link; and
   a third link having one end connected to the second link and another end having a rocking center that changes position by the actuator;
   wherein the controller defines a ratio between a crankshaft rotation torque generated by a piston downward force caused by the cylinder-internal pressure, and torque trying to move the rocking center of the third link by the piston downward force caused by the cylinder-internal pressure as a cylinder-internal pressure division ratio; and
   wherein the controller estimates the engine load based on the detected drive output of the actuator and the cylinder-internal pressure division ratio.

6. The engine load estimating apparatus according to claim 3, wherein the controller changes the actuator drive output to a small drive output such that the actuator stops instantaneously, and estimates the engine instantaneous torque when the actuator starts the operation or finishes the operation based on the drive output when the actuator starts the operation or finishes the operation.

7. The engine load estimating apparatus according to claim 6, wherein the controller integrates the engine instantaneous torque estimated during a predetermined period with respect to the period, divides the integrated value by the period, and estimates the engine average torque during the predetermined period.

8. The engine load estimating apparatus according to claim 6, wherein the controller compares a variation pattern of the engine instantaneous torque estimated during a predetermined period with a previously set model pattern, and estimates the engine average torque of the most matched model pattern as engine average torque during the predetermined period.

9. The engine load estimating apparatus according to claim 1, wherein the controller detects the drive output of the actuator when the actuator moves the position of the top dead center of the piston upward.

10. The engine load estimating apparatus according to claim 9, wherein the controller gradually increases the drive output of the actuator when the actuator moves the position of the top dead center of the piston upward.

11. An engine load estimating method, comprising:
    driving an actuator during operation of the engine to change a position of a top dead center of a piston;
    detecting a drive output of the actuator;
    detecting an operation state of the actuator; and
    estimating the engine load based on the detected drive output of the actuator and the operation state of the actuator.

12. An engine load estimating apparatus comprising:
    means for changing a position of a top dead center of a piston;
    means for controlling the means for changing a position of the piston;
    means for detecting a drive output of the means for changing a position of the piston;
    means for detecting an operation state of the means for changing a position of the piston; and
    means for estimating an engine load based on the detected drive output and the detected operation state.

* * * * *